(12) United States Patent
Van Remortel

(10) Patent No.: US 9,085,671 B2
(45) Date of Patent: Jul. 21, 2015

(54) MINERAL BASED FILLERS USED AS A SUBSTITUTE FOR WOOD FILLERS IN SIMULATED WOOD PRODUCTS AND SIMULATED WOOD PRODUCTS CONTAINING THE SAME

(71) Applicant: UNIMIN CORPORATION, New Canaan, CT (US)

(72) Inventor: Scott Van Remortel, Bakersville, NC (US)

(73) Assignee: UNIMIN CORPORATION, New Canaan, CT (US)

( * ) Notice: Subject to any disclaimer, the term of this patent is extended or adjusted under 35 U.S.C. 154(b) by 5 days.

(21) Appl. No.: 13/846,474

(22) Filed: Mar. 18, 2013

(65) Prior Publication Data

US 2013/0253098 A1    Sep. 26, 2013

Related U.S. Application Data

(60) Provisional application No. 61/613,208, filed on Mar. 20, 2012.

(51) Int. Cl.
*C08K 3/34* (2006.01)

(52) U.S. Cl.
CPC .......................... *C08K 3/34* (2013.01)

(58) Field of Classification Search
USPC .......................... 524/13, 444, 585
See application file for complete search history.

(56) References Cited

U.S. PATENT DOCUMENTS

| | | | |
|---|---|---|---|
| 2,261,884 A | 11/1941 | Koenig | |
| 2,262,951 A | 11/1941 | Lyle | |
| 2,478,645 A | 8/1949 | Thiess | |
| 2,871,132 A | 1/1959 | Hummel | |
| 3,389,002 A | 6/1968 | Huffcut | |
| 3,486,706 A | 12/1969 | Weyand | |
| 3,917,489 A | 11/1975 | Waters, Jr. | |
| 3,998,624 A | 12/1976 | Harris et al. | |
| 4,028,289 A | 6/1977 | Brown | |
| 4,130,423 A | 12/1978 | Chastant et al. | |
| 4,183,760 A | 1/1980 | Funk et al. | |
| 4,242,251 A | 12/1980 | Aishima et al. | |
| 4,396,431 A | 8/1983 | Seeney et al. | |
| 4,468,473 A | 8/1984 | Drolet et al. | |
| 4,639,576 A | 1/1987 | Shoemaker et al. | |
| 4,640,797 A | 2/1987 | Goguen | |
| 4,743,625 A | 5/1988 | Vajs et al. | |
| 5,066,330 A | 11/1991 | Holcombe, Jr. et al. | |
| 5,153,155 A | 10/1992 | Kohut | |
| 6,569,923 B1 | 5/2003 | Slagter | |
| 6,790,904 B2 | 9/2004 | White et al. | |
| 2002/0137872 A1 | 9/2002 | Schneider et al. | |
| 2002/0173597 A1 | 11/2002 | Zarnoch et al. | |
| 2003/0056696 A1 | 3/2003 | Fenske et al. | |
| 2003/0085383 A1 | 5/2003 | Burnell-Jones | |
| 2003/0085384 A1 | 5/2003 | Burnell-Jones | |
| 2003/0224174 A1 | 12/2003 | White et al. | |
| 2003/0229157 A1 | 12/2003 | Schneider et al. | |
| 2004/0068048 A1 | 4/2004 | Giles et al. | |
| 2004/0175563 A1* | 9/2004 | Okerson ........................ 428/331 |
| 2005/0059765 A1 | 3/2005 | Finch et al. | |
| 2005/0214534 A1 | 9/2005 | Adamo et al. | |
| 2006/0005480 A1 | 1/2006 | West et al. | |
| 2006/0081371 A1 | 4/2006 | Duenckel et al. | |
| 2006/0106162 A1 | 5/2006 | Yamaguchi | |
| 2006/0160930 A1 | 7/2006 | Schneider | |
| 2006/0235113 A1 | 10/2006 | Dorgan et al. | |
| 2008/0011190 A1* | 1/2008 | Remortel et al. .......... 106/31.13 |
| 2009/0292046 A1 | 11/2009 | Dorgan et al. | |
| 2009/0308001 A1* | 12/2009 | Wu et al. ...................... 52/173.3 |
| 2010/0003431 A1 | 1/2010 | Raybuck | |

OTHER PUBLICATIONS

International Search Report and Written Opinion dated Jun. 17, 2013 in corresponding International Patent Application No. PCT/US2013/032841, filed Mar. 18, 2013.

* cited by examiner

*Primary Examiner* — Robert Harlan
(74) *Attorney, Agent, or Firm* — Rankin, Hill & Clark LLP

(57) ABSTRACT

A simulated wood product such as decking, fencing and architectural trim of the type heretofore made from a plastic with a natural wood powder as filler, wherein at least most, if not all, of the wood powder is replaced by a powder formed from a hard naturally occurring mineral, such as nepheline syenite or feldspar.

23 Claims, No Drawings

MINERAL BASED FILLERS USED AS A SUBSTITUTE FOR WOOD FILLERS IN SIMULATED WOOD PRODUCTS AND SIMULATED WOOD PRODUCTS CONTAINING THE SAME

This application claims priority in Provisional Patent Application Ser. No. 61/613,208, that was filed on Mar. 20, 2012 and which is incorporated by reference into the specification of this application.

This application relates to the art of a making simulated wood products and more particularly to a novel, simulated wood product wherein wood based fillers, such as sawdust wood flour, are replaced with mineral based fillers. In particular, the wood fillers are replaced with mineral fillers including hard fillers such as feldspathic fillers, including, but not limited to, nepheline syenite powder and feldspar powder.

Background of Mineral Fillers

Ground feldspathic fillers such as nepheline syenite and feldspar have been a commercial product for many years. Indeed, nepheline syenite powder in particulated form has been used extensively to make industrial compounds and to instill enhanced properties in liquid coatings, ceramics, glass, etc.

For illustrations of representative products or compounds employing standard processed particulate nepheline syenite, the following United States patents are incorporated by reference. Consequently, the general properties and procedures for using existing nepheline syenite particles need not be repeated.

| Koenig | 2,261,884 | use as flux in ceramic |
| --- | --- | --- |
| Lyle | 2,262,951 | color ingredient in glass |
| Thiess | 2,478,645 | porcelain glaze |
| Hummel | 2,871,132 | glazing compound |
| Huffeut | 3,389,002 | heat and corrosion resistant coating |
| Weyand | 3,486,706 | binder for grinding agent |
| Waters | 3,917,489 | ceramic flux |
| Harris | 3,998,624 | source of metalaluminum silicate |
| Brown | 4,028,289 | inorganic filler |
| Chastant | 4,130,423 | natural silicate for slag formation |
| Funk | 4,183,760 | alumina ceramic |
| Aishima | 4,242,251 | alumina silicate filler |
| Seeny | 4,396,431 | inorganic binder |
| Drolet | 4,468,473 | $SiO_2$ source |
| Shoemaker | 4,639,576 | electrode coating |
| Goquen | 4,640,797 | polymer filler |
| Vajs | 4,743,625 | vitrifying material |
| Holcombe | 5,066,330 | refractory filler |
| Kohut | 5,153,155 | nonplastic filler |
| Slagter | 6,569,923 | polymer cement |
| White | 6,790,904 | liquid coating |

Disclosures contained in the patents listed above are incorporated by reference as background technology. Particulate nepheline syenite is used in diverse products and for many applications.

Other uses of standard, ground nepheline syenite have been recently suggested. Representative examples of such newer applications of ground nepheline syenite are disclosed in the following United States patent publications:

| Schneider | 2002/0137872 | scratch resistant coating |
| --- | --- | --- |
| Zarnoch | 2002/0173597 | filler in resin powder |
| Fenske | 2003/0056696 | filler for polymer cement |
| Burnell | 2003/0085383 | suspending filler |
| Burnell | 2003/0085384 | heat curable resin |
| White | 2003/0224174 | filler in liquid coating |
| Scheider | 2003/0229157 | scratch resistant powder coating |
| Giles | 2004/0068048 | filler for rubber |
| Finch | 2005/0059765 | filler for plastic coating |
| Adomo | 2005/0214534 | extender for curable composition |
| Duenckel | 2006/0081371 | sintering aid |
| Schneider | 2006/0160930 | corrosion resistant coating |
| Dorgan | 2006/0235113 | filler for polymer |

These prior descriptions illustrate uses, or proposed uses, of ground nepheline syenite. Such additives have been used for many industrial components and as a filler, an extender or another component of consumer materials, such as coatings. However, as will be discussed in greater detail below, the totality of this prior and extensive background technology has not led the simulated wood product industry to discover the concept of a hard mineral filler to replace the softer wood fillers. When making synthetic wood products, such as synthetic wood decking and other items typically designed for outdoor use, it has been standard practice to use wood fibers or powder as the filler. The present invention constitutes a novel improvement in these synthetic or simulated wood products.

Background of Wood-Plastic Composites

Wood plastic composites are composite materials made of wood fiber/flour and plastic(s). In addition to wood fiber and plastic, wood plastic composites can also contain other filler materials. Wood plastic composites are a subset of a larger category of materials called natural fiber plastic composites, which may contain fiber fillers such as pulp fibers, peanut hulls, bamboo, straw, digestate and the like. These natural cellulose materials have the general characteristics of natural "wood" fillers. While the invention of this application has been found to work particularly well when replacing wood fillers in plastic composites, it is not to be limited thereto and could be used as a replacement for these other fiber fillers when making such products. Thus, the filler can be generally referred to as "wood" filler in background to the invention or generally cellulose filler.

The most widespread use of wood plastic composites in North America is in outdoor deck floors, but it is also used for railings, fences, landscaping timbers, cladding and siding, park benches, molding and trim, window and door frames, and indoor furniture. Wood plastic composites were first introduced into the decking market in the early 1990's. Wood plastic composites can require less maintenance than the alternatives of solid wood treated with preservatives or solid wood of rot-resistant species. These materials can be molded with or without simulated wood grain details.

Wood plastic composites are produced by thoroughly mixing ground wood particles or wood filler and heated thermoplastic resin. The most common method of production is to extrude the material into the desired shape, though injection molding is also used. Wood plastic composites can be produced from either virgin or recycled thermoplastics including HDPE, LDPE, PVC, PP, ABS, PS, and PLA. Polyethylene based wood-plastic composites are by far the most common. Additives such as colorants, coupling agents, UV stabilizers, blowing agents, foaming agents, and lubricants help tailor the end product to its target area. Extruded wood plastic composites are formed into both solid and hollow profiles.

In some manufacturing facilities, the constituents are combined and processed in a pelletizing extruder, which produces pellets of the new material. The pellets are then re-melted and formed into the final shape. Other manufacturers complete the finished part in a single step of mixing and extrusion.

Wood plastic composites do not corrode and are less resistant to rot, decay than natural or solid woods. Wood plastic composites have good workability and can be shaped using conventional woodworking tools. One advantage over actual wood is the ability of the synthetic material to be molded to meet almost any desired shape. A wood plastic composite member can be bent and fixed to form strong arching curves. Another major selling point of these materials is their lack of need for paint. They are manufactured in a variety of colors, but are widely available in grays and earth tones.

Despite up to 70 percent cellulose content, the mechanical behavior of wood plastic composites is most similar to neat polymers. This means that they have a lower strength and stiffness than actual wood, and they experience time and temperature-dependent behavior. Further, the wood particles used as filler are susceptible to fungal attack, though not as much so as actual wood, and the polymer component is vulnerable to UV degradation. It is also believed that the strength and stiffness of these structural materials can be reduced by the moisture absorption and freeze-thaw cycling. Some wood-plastic composites formulations are also sensitive to staining from a variety of agents.

The simulated wood products industry has for years used sawdust or wood flour as a filler. This is the normal "wood" filler of simulated wood products. In this respect, the use of wood flour or sawdust to form composites with polyolefins or PVC plastics for home construction materials, in particular, but not restricted to, residential outdoor decks was used since the wood fillers were low cost or free. However, low cost wood fillers are no longer as widely available and now command higher prices.

Wood based fillers also absorb moisture that degrades the structural integrity of wood plastic composite decking lumber. Moisture can be absorbed even by the wood fibers embedded within the composite or "plastic" material. As a result, these wood based fillers must be dried at significant expense before use. Further, because of the high absorptive capacity of wood based fillers, even though they are dried before compounding, they will absorb moisture during production and use thereby reducing the durability of a wood plastic composite decking.

Other problems that are being encountered with wood based fillers are that these fillers are flammable which must be taking into consideration during processing and they increase the flammability of the simulated wood decking. Yet another problem relating to the use of wood based fillers is that they contain extractives and impurities that can adversely affect the UV stabilizers needed to prevent discoloration of the simulated wood products during use. Further yet, supply and product consistency have declined over the years which has added to cost increases and reduced quality.

The weathering characteristics of wood based fillers are also less than desirable. In this respect, wood based fillers increase fading and cracking of the simulated wood products. In that wood based fillers are high in moisture and lignin, these filler can be food for bugs and its thermal expansion properties are poor.

As a result, there is a need in the industry to replace these wood based fillers with fillers that do not have these many disadvantages and which are competitive in price. It is a primary object of the invention to provide a novel filler for composites that simulate wood components.

SUMMARY OF THE INVENTION

An improvement has been made in simulated wood decking, fencing and architectural trim of the type heretofore made from a plastic with a natural wood powder as filler. In accordance with the invention, at least most of the wood powder is replaced by a "hard mineral powder". In the preferred embodiment, there is essentially no wood powder. The "hard mineral powder" developed as a substitute for the normal wood powder is broadly defined as a powder formed from a primary naturally occurring mined mineral with a Mohs hardness of at least 5. The remainder of the "hard mineral powder", if any, is formed from a small amount of a secondary hard mineral.

"Mineral" is either a compound formed from minerals, like nepheline syenite or a mined mineral, like feldspar. This definition applies to both the primary and secondary minerals, if any. A "hard mineral powder" is a "mineral" as defined above. "Minerals" used in the invention include feldspathic minerals including feldspar and nepheline syenite and include minerals such as sodium potassium alumino silicate. Feldspathic minerals, nepheline syenite, feldspar, sodium potassium alumino silicate are minerals that have a Mohs hardness of at least 5 and are "hard".

Preferably essentially all of the mineral constituting the "mineral powder" is the primary naturally occurring mined hard mineral, which is preferably nepheline syenite. While other minerals, if used as a mineral filler of the "mineral powder", can be a softer mineral, such as mica or talc. These add mineral content to the filler mass, but are not the "hard" mineral contemplated by the invention.

Thus, a primary aspect of the present invention is the provision of a hard mineral based filler used to replace wood based fillers in simulated wood products. Minor amounts of other minerals or even some cellulose fillers can be used without departing from the intent of this invention.

It has been found that the hard mineral based fillers mentioned above work particularly well when used in connection with plastic composite decking and architectural trim and are preferred; but, this application is not to be limited to the use of "only" these particular hard materials.

In greater detail, the use of hard mineral fillers in simulated wood products has been found to overcome many of the disadvantages of wood based fillers, even though it was originally believed that the use of mineral based fillers would not produce the needed results. Such advantages are not obtained by merely using minerals without a major portion, indeed nearly all, of the mineral powder being formed from hard minerals.

According to another aspect of the invention of this application, there is provided a plastic composite decking material that includes a mineral based filler used in replacement of a wood based filler and the majority of the mineral based filler is a "hard" minerals with a Mohs hardness of at least 5. Majority means that the primary "hard" mineral has a percentage of over 50% of the replacement mineral filler. In other embodiments over 75% hard mineral filler is used in the total filler. In accordance with preferred embodiments, the hard mineral filler includes over 90% of the replacement filler and, preferably hard mineral powder is all of the replacement filler.

According to certain embodiments of this application, the mineral filler is a feldspathic material that includes, but is not limited to, nepheline syenite and feldspar.

It has been found that wood fillers absorb moisture that degrades the structural integrity of wood plastic composite material. Wood fillers must therefore be dried at significant expense before use. Mineral based fillers, such as nepheline syenite and feldspar, naturally have a very low moisture content, and do not need an extra drying step before compounding. As a result, there is a reduced processing cost associated with the processing of the plastic composite material.

Wood fillers are flammable which increases the overall fire risk for these plastic composites including a fire risk associated with the storage and use of the wood filler. Mineral fillers on the other hand are fully oxidized and non-combustible thereby lowering the overall fire risk for plastic composites.

Because of the high absorptive capacity of wood fillers, even though they are dried before compounding, the wood filler will absorb moisture during use and reduce the durability of a wood plastic composite decking lumber. As discussed above, this even includes moisture absorption by the wood fiber embedded in the plastic. Therefore, wood plastic composite made with non-absorptive mineral fillers as contemplated by this invention will exhibit higher durability than wood plastic composite members made with wood fillers.

Wood plastic composites require UV stabilizers to prevent discoloration during use. Wood fillers contain extractives and impurities that can adversely affect these stabilizers. Due to its chemical purity and very low iron and UV stability, of minerals, such as nepheline syenite, these mineral fillers when used in plastic composite will be more efficient with regard to usage of UV stabilizers.

Due to the high thermal conductivity of mineral fillers, such as nepheline syenite fillers, compared with wood flour, plastic composite made with mineral fillers as contemplated by this invention will have an advantage to the manufacturer of greater processability during compounding and less heat build up during day light exposure. This reduces thermal expansion, which can further increase the life expectancy of the plastic composite.

Compared with wood fillers, it has been discovered that hard mineral fillers, such as nepheline syenite fillers, have a smooth, non-porous surface to improve the stain resistance and aid in easier clean-up in plastic composite decking, architectural trim and accessory products.

In one embodiment, the wood based filler is replaced with MINEX 3 produced by the Unimin Corporation. MINEX 3 is a nepheline syenite having a particle size range wherein the D99.9 is about 75 microns. Further, MINEX in general is an anhydrous mineral filler wherein it has a moisture content of <0.2% and is a photo-chemically stable with a fine grain size for improved weathering and has been found to be superior to all fillers in outdoor exposure tests. In other embodiments, other MINEX products have been used, such as MINEX 2 having a maximum particle size of about 100 microns. Yet even further, the particle size of the mineral powder, such as the particle size of the MINEX, can be based on the material thickness of the composite material. In this respect, thicker composite boards or products can utilized larger grained minerals while thinner composite board could utilized finer grained minerals, such MINEX 4, 7, 10 and/or 12. MINEX has been found to improve the fade resistance when used as a filler in these engineered materials. Further, it has been found that fillers, such as MINEX, have much lower thermal expansion than polyolefin resins wherein MINEX has been found to lower the thermal expansion in the composite plastic material such as composite plastic decking. Again, while it has been found that MINEX 3 works particularly well, other MINEX products have been found to exceed expectations to allow the use of a hard mineral filler to replace soft wood fillers wherein this application is not to be limited to the use of MINEX 3. Further, the mineral fillers of this application can be sized by a 200 mesh screen. This results in a powder with a maximum particle size of about 80 microns.

According to other aspects of the invention of this application, the mineral filler can include one or more mineral constituents where a hard mineral and a secondary additional mineral are combined to improve overall characteristics of the end product. The secondary minerals can include a platy or fiber type minerals, such as talc or mica.

According to yet other aspects, varying levels of the wood pulp could be replaced with the hard miner fillers of this application even though it is preferred that there is a 100% substitution with hard mineral filler. The hard mineral powder can be powders of different hard minerals. As an alternative, the hard mineral filler can be combined with a minor amount of soft minerals or even cellulose particles.

PREFERRED EMBODIMENTS

Standard plastic simulated wood products are commonly manufactured by extruding a mixture of a plastic, such as high density polyethylene having a filler. The standard filler has heretofore been ground recycled wood in fairly small powder sizes. The disadvantages of using wood powder have been explained. The present invention involves replacement of the wood powder by a specific mineral powder having certain distinct physical characteristics. The novel mineral powder is a silicate powder having a Mohs number exceeding 5. Consequently, the silicate powder of the invention is considered to be "hard." In the preferred embodiment of the present invention, the silicate powder is MINEX 3, a fine grain nepheline syenite powder sold by Unimin Corporation. This powder is mined and has a maximum particle size D99.9 of about 75-80 microns. In the preferred embodiment of the invention, all of the wood powder is replaced by the mineral powder. The resulting mixture is then extruded into simulated wood structural complements. The plastic in the preferred embodiment is the standard plastic used in such simulated wood composite formed into architectural complements. The final product produced by using the preferred embodiment of the invention has excellent color retention, fade resistance, and extended service life over the prior art simulated wood products using wood powders as a filler. The nepheline syenite powder of the preferred embodiment was sized by a 200 mesh screen. This defines the size of the preferred nepheline syenite powder. After producing structural elements using the preferred embodiment of the present invention, the invention was practiced again by replacing only 90% of the wood powder with the MINEX 3 nepheline syenite powder. Then a third sample of the invention was made by replacing only 50% of the wood powder with the novel nepheline syenite mineral powder. It was found that the advantages created by the first preferred embodiment were maintained to a lesser degree as the percentage of substitution decreased. Consequently, the preferred embodiment is the substitution of essentially all the wood powder by the novel nepheline syenite powder or other powder made from hard mineral material. The invention is the use of a vast majority, indeed essentially all, of the mineral filler made from hard mineral to obtain improved physical integrity, appearance and workability.

MINEX 3 is the preferred nepheline syenite powder used in the practice of the invention; however, samples have been produced using MINEX 2 having a maximum particle size approaching 100 microns. This MINEX 2 example of the invention employed a maximum particle size D99.9 which is about 100 microns. The use of MINEX 2 essentially duplicated the preferred embodiment using MINEX 3. Consequently, it was determined that nepheline syenite powder having a maximum particle size of less than about 100 microns could be used in practicing the invention by replacing the wood filler. This example obtained the advantages realized with the use of the MINEX 3 powder. Further embodiments of the invention were used where 100% of the wood powder was replaced by MINEX 7 and MINEX 10, instead of MINEX 3. These latter two nepheline syenite powders have substantially smaller maximum particle sizes, but the particle size of the nepheline syenite powder does not change the characteristics obtained by the present invention. However, if the structural element formed from the novel simulated wood product is to be thin or an extremely smooth surface, the finer nepheline syenite powders have a certain structural and physical advantage. Mixing of the nepheline powder into the plastic composition uses various standard processing methods.

Another embodiment of the present invention was replacing essentially all of the wood powder with a second silicate mineral, i.e., feldspar. Examples had the same particle size properties as the preferred nepheline syenite powders. In the preferred sample of this alternative, the feldspar was ground and sized through a 200 mesh screen so that the particle size of the feldspar powder was about 80-90 microns. Consequently, the particle size of the feldspar powder was less than 100 microns. The simulated wood product produced by using the feldspar powder had the same advantages realized by nepheline syenite powder in the first preferred embodiments of the invention. Percentages of wood powder replaced by nepheline syenite powder were used in the embodiments where the novel mineral filler was feldspar powder. In summary, the present invention preferably employs a replacement of the wood powder by nepheline syenite powder; however, a further preferred embodiment involves using feldspar powder having a particle size of less than 100 microns. These two powders are sometimes mixed and/or used with other mineral powders, both hard and non-hard. A minor amount of other fillers does not distract from the advance of the present invention.

Statement of Invention

In accordance with the present invention, there is provided an improvement in a simulated wood product. The wood product includes a standard plastic with a particulate filter. In the past, the filter has been wood powder with substantial disadvantages. The present invention is an improvement in the simulated wood product as routinely produced and used throughout the world for structural components, like decking. The improvement comprises replacing 50% to 100% of the normal wood powder with a powder formed from naturally occurring, mineral material. The naturally occurring mineral material powder is formed from a hard mineral material having a Mohs number of at least 5. The hard mineral material powder used to practice the invention is preferably nepheline syenite or feldspar.

In accordance with another aspect of the invention, at least 90% of the wood powder filler is replaced with a mineral powder, which mineral powder is primarily hard mineral powder, such as nepheline syenite or feldspar.

As another aspect of the invention, essentially all of the wood filler is replaced with a mineral powder filler that is formed primarily from a naturally occurring hard mineral material. In the preferred embodiment the mineral powder is essentially all hard mineral powder. However, the mineral powder replacing the wood powder may be a mixture of hard mineral powders or hard mineral powder and minor amount of softer mineral material. Irrespective of these alternatives, in accordance with the preferred embodiment of the invention, a majority of the replacing powder filler is made from hard mineral. Indeed, preferably all of the replacement mineral powder is a powder formed from a hard, naturally occurring mineral material. In summary, the statement of invention involves a novel concept of replacing the wood filler in a simulated wood product by a powder formed from a hard, naturally occurring mineral material, such as nepheline syenite and feldspar. But the invention is broader and may include inclusion of a small amount of other minerals. Furthermore, a small portion of the wood filler may be retained, even though such retention is not beneficial.

In accordance with another aspect of the present invention, the hard mineral powder has a maximum particle size D99.9 of less than 100 microns. This is roughly in the range of a particle size passing through a 200 mesh screen.

In accordance yet a further aspect of the invention, a simulated wood product is produced with a particulate filter where the particulate filter is powder from hard mineral material with a Mohs number of at least 5. Again, such unique mineral material is nepheline syenite powder, feldspar powder, and powders formed from other naturally occurring hard mineral material. "Mineral material" means either a unique mineral or a mined material formed from various minerals.

In accordance with still a broader aspect of the present invention, a simulated wood product of the type normally having a wood powder filter is improved by replacing most, if not all, of the powdered wood filler with a powder formed from a mineral silicate. This mineral silicate material has a maximum particle size of less than 100 microns and may be of various compositions, such as nepheline syenite, feldspar and sodium potassium alumino silicate powder.

Other implementations and aspects of the present invention are taught by this description to a person with ordinary skill in the art of making simulated wood products.

Implimention and Advantages

The invention of this application is the use of a novel filler in a simulated wood product, such as decking, fencing and architectural trim of the type heretofore made from various plastic with a natural wood powder as the filler. As explained above, the primary aspect of the invention is the use of preferably one, but possibly two or more, hard mineral for the powder as a filler in simulated wood products. Preferably, the powder used in the invention is nepheline syenite powder having a maximum particle size of less than 100 microns. In the two major implementations of the invention, the nepheline syenite powder is MINEX 3 and MINEX 2 produced and sold by the Unimin Corporation. Although some of the wood powder could remain in the simulated wood product without departing from the invention, it is preferable that all of the wood filler be replaced by the novel filler powder formed from a hard mineral material. The "hard mineral powder" used as a substitute for the normal wood powder is broadly defined as a powder from a primary naturally occurring mined mineral with a Mohs hardness of at least 5. Some of the hard mineral powder may be formed from a small amount of a second hard mineral material. In other words, the hard mineral material used as the filler can be all of one type or can be a mixture of two or more types of powder formed from hard minerals. Preferably only one hard mineral powder is used and it replaces essentially all of the prior filler formed from wood powder.

The hard mineral material is either a compound formed from minerals, like nepheline syenite, or a mineral itself, like feldspar.

In summary, the primary object of the present invention is the provision of a filler powder to replace the wood filler in a simulated wood product, which powder is formed from a hard mineral material, such as nepheline syenite or feldspar.

The novel use of hard minerals for the filler powder in a simulated wood product has been found to overcome many of the disadvantages of wood-based fillers, even though there was no evidence that the use of the mineral-based fillers would produce the needed results and/or could be used in this particular environment. The present invention which anticipates the replacement of all wood filler from simulated wood products overcomes the disadvantages associated with the use of wood powder as a filler. For instance, wood powder fillers absorb moisture that degrades the structural integrity of wood plastic composite material. Wood fillers must therefore be dried at significant expense before use. Hard mineral fillers, such as nepheline syenite and feldspar, naturally have a very low moisture content and do not need an extra drying step before compounding with the plastic. As a result, there is a reduced processing cost associated with the processing of plastic composite materials using the present invention. Such hard mineral filler adds strength, integrity, stiffness, smoothness and manufacturability to the simulated wood products.

Wood fillers are flammable which increase the overall risk these plastic composites using wood powder filler. A fire risk is associated with the storage and use of the wood filler product. Hard mineral fillers of the present invention on the other hand are fully oxidized and non-combustible thereby lowering the overall risk of fire for the plastic composition constructed in accordance with the present invention.

Because of high absorptive capacity of wood powder fillers, even though they are dried before compounding, the wood powder filler will absorb moisture during use and reduce the durability of wood plastic composite used as a simulated wood product, like decking lumber. As discussed above, this even includes moisture absorption by the wood filler imbedded in the plastic. Therefore, wood plastic composition made with non-absorptive hard mineral fillers as anticipated by the present invention exhibit higher durability than the plastic composition materials using wood powder as the filler.

As is known, simulated wood products using wood powder as the filler require UV stabilizers to prevent discoloration during extended use. The wood fillers in the prior art contain impurities that can adversely affect the stabilization during long-term use. Because of the chemical purity, very low iron and UV stability of hard minerals, such as nepheline syenite, fillers made from these hard minerals and used in a plastic composition, are more efficient with regard to usage of UV stabilizers.

Due to the high thermal conductivity of the hard mineral fillers of the present invention, plastic composition made with the novel hard mineral fillers has an extremely high advantage in manufacturing due to the higher processability during compounding and less heat buildup during the daytime exposure of the product. Furthermore, there is a reduced thermal expansion in the product using the present invention, which property further increases the life expectancy of the simulated wood product of the present invention.

Use of a hard mineral, such as nepheline syenite, for the powder filler in the simulated wood product creates a smooth, nonporous surface for the product. This improves the stain resistance and aids in further cleanup in the simulated wood product which may be used as decking, architectural trim, and accessory products.

In the preferred embodiment of the present invention, the wood powder filler is completely replaced with MINEX 3 produced by Unimin Corporation. MINEX 3 is nepheline syenite powder having a maximum particle size D99.9 of about 75 to 80 microns. This particular product has a moisture content of less than 0.2% and a photochemical stability with a fine grain size for improving weathering and has been found to be superior to all mineral fillers in outdoor exposure tests. For that reason, MINEX 3 powder is the preferred filler used to replace the wood powder filler in the simulated wood product. As disclosed above, the invention also has been implemented by using MINEX 2. MINEX 2 is a nepheline syenite powder having a maximum particle size of less than 100 microns. MINEX powder has been found to improve the fade resistance when used as a filler in the present invention. Further, it has been found that nepheline syenite powder fillers, such as MINEX fillers, have much lower thermal expansion than the plastic used as the primary component in the simulated wood product itself. Thus, MINEX powder has been found to lower the thermal expansion of the composite plastic material to which the present invention is directed. Although it is found that MINEX 3 works particularly well, other MINEX powders have also been found to produce the advantages described in this application. Thus, the replacement of the wood filler is not limited to any particular nepheline syenite or any particular hard mineral material. The MINEX powders can be sized by a 200 mesh screen since they generally have a maximum particle size of less than 100 microns.

The invention involves the replacement of the wood filler with a powder formed from a hard mineral material. While hard mineral material forms the primary powder to replace the wood powder in a simulated wood product, other mineral materials can be used. However, they generally decrease the advantages obtained by a complete use of the novel hard mineral material anticipated by the present invention. The invention is described as allowing a certain amount of other filler powders, mineral or not mineral, to be used without distracting from the advantages obtained by practicing of the present invention.

When using a hard mineral filler of the invention, the thickness of the product can be reduced without sacrificing strength and structural integrity by using finer powder of the mineral.

Concepts from Provisional Claims

In the provisional application forming the parent filing of the present application, certain concepts of the invention are disclosed in the claims. The primary object of the invention is a plastic composition decking material wherein at least most of the natural wood powder filler is replaced by a hard mineral filler. The hard mineral filler is a powder formed from a mineral having a Mohs hardness of at least 5. Preferably, the hard mineral powder is a feldspathic mineral, such as nepheline syenite or feldspar. The hard mineral powder has a particle size with a D99.9 particle size of less than 100 microns. Indeed, the D99.9 particle size can be less than 75 microns or less than 45 microns. There is no targeted, controlled minimum particle size of the powder used in practicing the invention.

Substantially all of the natural wood powder is replaced by the hard mineral powder in accordance with the preferred product. Further, all of the new powder filler is a single hard mineral, such as nepheline syenite.

In accordance with an aspect of the invention, the hard mineral powder is a primary powder and the plastic composition includes at least one secondary mineral powder. In this disclosure, the secondary mineral powder is a soft mineral having a Mohs number less than 5. The secondary mineral powder is defined as including at least a platy and a fiber-type mineral. Such secondary mineral constitute mica or talc. The primary hard mineral powder in this modification of the invention is three times the secondary mineral powder. The primary hard mineral constitutes at least 50% of the mineral powder used as a filler. This percentage can be raised to 75% of the mineral powder; however it is preferably 100% of the mineral powder. The hard mineral powder of the invention includes various types of minerals that meet the defined properties of the invention. Basically, the hard mineral powders are formed from feldspathic mineral, feldspar, nepheline syenite, and sodium potassium alumino silicate. These general modifications of the present invention are disclosed in the parent application and are incorporated herein by reference.

Recapitulation

The invention is the discovery of using hard mineral material for the filler powder in simulated wood products. The appended claims broadly express the disclosed invention with certain limitations and alternatives.

The invention claimed is:

1. In a plastic simulated wood product selected from the class consisting of decking, fencing and architectural trim, said product being the type including a wood powder filler, the improvement comprising: replacing at least 50% of said wood powder filler with a primary powdered replacement filler formed from a mineral material with a Mohs hardness of at least 5 and where said primary powdered replacement filler has a maximum particle size D99.9 of less than about 100 microns.

2. The improvement, as defined in claim 1, wherein said product also includes one or more secondary powdered replacement filler formed from naturally occurring mineral material.

3. The improvement, as defined in claim 2, wherein said one or more secondary powdered replacement filler has a Mohs hardness of less than 5.

4. The improvement as defined in claim 2, wherein essentially all of said wood powder filler is replaced by at least one of said primary powdered replacement filler and said secondary powdered replacement filler.

5. The improvement, as defined in claim 2, wherein at least 90% of said wood filler is replaced by said primary powdered replacement filler.

6. The improvement, as defined in claim 1, wherein at least 90% of said wood filler is replaced by said primary powdered replacement filler.

7. The improvement, as defined in claim 1, wherein at least 75% of said wood filler is replaced by said primary powdered replacement filler.

8. The improvement, as defined in claim 1, wherein said primary powdered replacement filler replaces essentially all of said wood filler.

9. The improvement, as defined in claim 1, wherein said primary powdered replacement filler includes a mined material comprising natural minerals.

10. The improvement, as defined in claim 1, wherein said primary powdered replacement filler includes nepheline syenite.

11. The improvement, as defined in claim 1, wherein said primary powdered replacement filler is nepheline syenite.

12. The improvement, as defined in claim 1, wherein said primary powdered replacement filler includes feldspar.

13. The improvement, as defined in claim 1, wherein said primary powdered replacement filler is feldspar.

14. The improvement, as defined in claim 1, wherein said primary powdered replacement filler is a naturally occurring mined material.

15. The improvement, as defined in claim 14, wherein said naturally occurring mined material includes more than one mineral with one of said minerals being nepheline syenite.

16. The improvement, as defined in claim 14, wherein said naturally occurring mined material includes more than one mineral with one of said minerals being feldspar.

17. The improvement, as defined in claim 14, wherein said naturally occurring mined material is formed from a mineral silicate powder.

18. The improvement, as defined in claim 14, wherein said mineral silicate powder is sodium potassium alumino silicate powder.

19. The improvement, as defined in claim 1, wherein said maximum particle size D99.9 is less than about 80 microns.

20. The improvement, as defined in claim 1, wherein said maximum particle size D99.9 is less than about 75 microns.

21. The improvement, as defined in claim 1, wherein said maximum particle size D99.9 is less than about 45 microns.

22. The improvement, as defined in claim 14, wherein said primary powdered replacement filler has a moisture content of less than about 0.2%.

23. The improvement, as defined in claim 1, wherein said primary powdered replacement filler has a D100 particle size greater than 45 microns.

* * * * *